United States Patent [19]

Yap

[11] Patent Number: 5,593,780
[45] Date of Patent: Jan. 14, 1997

[54] IMPACT RESISTANT PHENOLICS

[75] Inventor: Hugh A. Yap, Marysville, Wash.

[73] Assignee: Fiberite, Inc., Tempe, Ariz.

[21] Appl. No.: 241,079

[22] Filed: May 11, 1994

Related U.S. Application Data

[63] Continuation-in-part of Ser. No. 791,824, Nov. 13, 1991, abandoned.
[51] Int. Cl.⁶ ........................................ B32B 9/00
[52] U.S. Cl. ........................ 428/392; 428/396; 428/542.8
[58] Field of Search ................................. 428/375, 392, 428/396, 542.8

[56] References Cited

U.S. PATENT DOCUMENTS

| | | | |
|---|---|---|---|
| 3,791,850 | 2/1974 | Deshay et al. | 117/75 |
| 4,845,162 | 7/1989 | Schmitt et al. | 525/423 |

*Primary Examiner*—Christopher Raimund
*Attorney, Agent, or Firm*—Gray Cary Ware & Freidenrich

[57] ABSTRACT

The present invention is directed to impact resistant or toughened phenolic based resin blends impregnated into a graphite fiber substrate to make a prepreg. The prepreg is used to fabricate storage bins for the transportation industry.

10 Claims, No Drawings

IMPACT RESISTANT PHENOLICS

This application is a continuation-in-part of application Ser. No. 07/791,824 filed Nov. 13, 1991, now abandoned.

The present invention is directed to the use of impact resistant or toughened phenolic based resins used in combination with fibers to make a prepreg used to fabricate storage or stowage bins for the transportation industry.

A problem in the aircraft industry is the deterioration of storage bins in the interiors of civil transportation aircraft. After in use service, these storage bins crack due to impact events from normal uses. As a result of the cracking and general deterioration of these storage bins, the bins must be replaced. Replacement of these bins have significant economic consequences.

The present invention applies to the use of phenolic based resins which, when in combination with a continuous fiber and a toughening agent, provide a material useful as storage bins thereby prolonging the useful life of these bins and realizing significant economic advantages. The resultant light weight product can be provided as either impregnated tow, tape, and/or woven materials. An added advantage of the use of phenolic based resins is the inherent nonflammability of these resins relative to other organic polymer resins currently in use, such as the epoxy resins. While certain parts of the storage bins are not as extensively regulated by authorities, there is a significant incentive on the part of the civil aircraft industry to make the interiors of their aircraft safer to fire hazards.

Heretofore, the aircraft industry has used glass, graphite, and Kevlar reinforced epoxy and phenolic based resins. The toughened epoxy resins do not perform as well as the toughened phenolic based resins as fire resistant material. The industry presently uses toughened and untoughened phenolic resins in combination with Kevlar and glass that do not perform as well as the present invention. The present invention exhibits useful advantages over the epoxy resins for use in high impact and fire resistant areas such as but not limited to storage bins, flooring, and galleys in aircraft. Other fields where the present invention may be found useful are in marine and land transportation vehicles.

SUMMARY OF THE INVENTION

The present invention relates to a composition comprising a blend of a phenolic based resin and a toughening agent which is a derivative of polyvinyl alcohol, to a method of using said blend impregnated on and/or into a substrate wherein said blend and substrate form a prepreg, to a prepreg which is cross-plied and used for the fabrication of storage bins in the interior of transportation vehicles. The substrate is preferably a continuous graphite yarn (i.e., an assemblage of twisted filaments, fibers or strands in the form of a continuous length), and said yarn-resin blend combination is often referred to as a prepreg. The method of using toughened phenolic based prepreg to fabricate storage bins prolongs the expected life of the storage bins and reduces the hazard of flammability in the interior of transportation vehicles. This method of using toughened phenolic based resins is particularly advantageous in civil aircraft.

The phenolic resins may be toughened with toughening agents such as, but not limited to, elastomers, core/shell particles, rubber, and thermoplastic polymers such as the ketones, sulfones, derivatives of polyvinyl alcohol (e.g. polyvinyl butyral, polyvinyl formal), esters, imides, amides and copolymers and blends thereof. Toughening agents enhance the impact resistant properties of phenolic resins. Fibers, such as carbon fibers, glass, or Kevlar and combinations thereof and/or therebetween, may be added to the phenolic resin for additional strength.

The phenolic resins are selected from the general class of novalacs and resoles, where the alcohols are selected from phenols, alkylated phenols, arylated phenols, halogenated phenols, fused aromatic ring structures, polynuclear phenols and combinations thereof. Aldehydes are selected from formaldehyde, paraformaldehyde, furfural, acetaldehyde, higher alkylated aldehydes, aromatic aldehydes and combinations thereof and/or therebetween. Other reactive systems include phenols and substituted phenols in combination with dicyclopentadiene, norbornene, and other reactive hydrocarbons.

The phenolic based resins that exhibit particular advantages for this purpose are resoles; SC-1008, SL359A, SC-535, SC-540 (all obtained from The Borden Company, Louisville, Ky.), novalacs, Varcum 29–505 (obtained from OxyChem, North Tonowanda, N.Y.), HRJ-1166 and HRJ-2190 (both obtained from Schenectady Chemicals, Schenectady, N.Y.). Most preferably the SC-1008 and SL-359A are the phenolic resins of choice.

Once the phenolic resin is compounded into a blend, the blend is filmed and used to impregnate fibers to make tows that can be formed into appropriate shapes, known by those skilled in this art. Several methods may be used to impregnate the resin onto and/or into the appropriate substrate or reinforcements. One such preferred method is the hot melt technique, wherein a film of the resin blend is prepared and applied to the substrate. Another method is a solution impregnation technique wherein the substrate is run through a solution of the resin blend. Any solvents used in the solution impregnation technique must subsequently be substantially removed.

The amount of thermoplastic toughening agent used should be less than 15% by weight based upon the total weight of the phenolic resin/toughening agent blend. Preferred results are achieved with from 5% to 15% of the toughening agent. Especially preferred results are achieved with about 10% by weight of the toughening agents based upon the total weight of such blend. The resultant blend is equal to from 20 to 40 weight percent of the total weight of the prepreg tape, preferably from 30 to 38 weight percent, and most preferably from 33 to 37 weight percent. The preferred product form is the prepreg tape, most preferred is a graphite prepreg tape—i.e, graphite fibers impregnated with the phenolic resin/toughening agent blend.

The tape product is unidirectional (i.e., substantially all of the fibers are oriented in the same direction.)and is subsequently cross-plied as a skin, then bonded to some core material to make a sandwich structure to insure maximum impact resistance and a balance of other mechanical properties. A preferred unidirectional tape has a fiber areal weight—i.e. the weight of fiber per unit area (width×length) of about 120 g/m$^2$. Cross-plied means that additional plies of prepreg are laid-up so that adjacent plies are not unidirectional to each other. Preferably, the cross-plies are placed orthogonal to each other. The core material is preferably comprised of Nomex (DuPont) honeycomb core. The unidirectional tape product provides a light weight, low smoke, fire resistant, high impact, and other additional useful mechanical properties that results in a useful structural material.

The flammability properties of phenolic resins have been shown to pass the Ohio State University Heat Release Test ("OSU Test") required by the Federal Aviation Administration ("FAA") for materials to be used for purposes other than storage bins. However, even though this test is not required for the use of materials for the interior of the storage bins, nonetheless, the phenolic resins have successfully fulfilled the requirements of this test, showing their usefulness as a flame retardant material. Advantageously, the addition of toughening agents to the phenolic resin is not significantly dispositive to the OSU Test and/or the smoke density test described hereinbelow. For this purpose, the preferred toughening agent is polyvinyl butyral.

There are other areas in the interior of an aircraft that as of yet are not regulated rigorously by the FAA where the present invention disclosed herein could be advantageously employed. These include but are not limited to the floors of the aircraft, closets, air conditioning ducts, and cockpit areas. It is important and therefore desirable for the useful purposes disclosed herein for the outer surface or skin portion of the product to be substantially free of surface defects and provide a smooth high surface quality which is inherent to the present invention.

The following examples are provided to further illustrate the present invention. Their presentation is intended to further teach the invention and are not intended to limit the scope of the invention.

EXAMPLE 1

SL-359A phenolic resin (obtained from Borden) at 86.4 weight percent is mixed in a one step operation with a 24 weight percent solution of polyvinyl butyral B-76 grade Butvar (obtained from Monsanto) in isopropyl alcohol (IPA).

The final formulation is 86.4 weight percent phenolic resin and 13.6 weight percent polyvinyl butyral. The mixture is blended to a homogeneous blend and heated to approximately 55 degrees centigrade. A vacuum is applied to remove the IPA solvent to increase the resin solids from 72 weight percent to between 85 and 86 weight percent at which point resin filming occurs. The filming enable prepregging of the phenolic resin onto the graphite tows.

EXAMPLE 2

The proportions of Example 2 are the same as Example 1 but the examples were mixed differently. In Example 2 the Butvar is mixed with the phenolic resin which has been preheated to about 55 degrees centigrade. The Butvar powder is mixed at high speeds in an Dymax mixer and is dissolved completely after 2 and ½ hours. The mixture is kept below 93 degrees centigrade. After mixing is completed the blend is cooled to 55 degrees centigrade to allow for filming.

Filming occurs at about 57 to 60 degrees centigrade using a reverse blade coater, using 40–60 g/m² release paper coated with a silicone release. After filming graphite fiber tows are impregnated into the blend film at 166 to 171 degrees centigrade for approximately 10 seconds and immediately cooled to less than 38 degrees centigrade. The resulting prepreg has a fiber areal weight (FAW) ranging from 110 to 120 grams/meter square, (this weight is preferably less than or equal to the 120 value) a resin content ranging from 33 to 37 weight percent. The prepreg is stored at minus 18 degrees centigrade to prevent further polymerization.

The results of various tests performed on the impact resistant phenolic resin material are presented in the Table. The tests performed are described as follows:

Peel strength measures the adhesion of the prepreg to the Nomex honeycomb cores. Typically, the higher the value, the greater the adhesion. Interlaminar bond strength measures the adhesion of the prepreg to itself. Generally, the higher the value, the greater the adhesion. The OSU Test measures the energy of a burning polymer. Generally, the higher the value, means greater heat is given off. OSU Test values are expressed as peak and total heat release. FAA requires no more than 65 kilowatts-minutes/meters square/ 65 kilowatts/meters square. NBS Smoke Generation measures the concentration of smoke generated, preferably less than 100 index, from a polymer undergoing combustion. Generally, the higher the value, the higher the smoke content. Impact strength measures the resilience of a material or its ability to bear a load without fracturing. This test is performed using an object of known weight, dropped from a specified height. The higher the value, the greater the impact strength. Lone Beam Flexural measures the bending strength or the rigidity of a material. Generally, the higher the value the greater the rigidity.

TABLE

|  | Example 2 | Industry Standard |
|---|---|---|
| Peel Strength (in-lb/3") | 14 | 5–6 |
| Interlaminar bend (in-lb/3") | 5–6 | NA |
| OSU (KW/M²) | 53/44 | 60/53 |
| NBS Smoke Density | 21 | 26 |
| Impact (in-lbs) | 90–100 | 20–25 |
| Weight (psf) | .306 | .282 |
| Long Beam Flexural (4 point bend, in lbs) | 140 | 60 |
| Surface final appearance | excellent | poor |

What is claimed is:

1. A prepreg comprising:
   (a) a composition comprising a phenolic based resin and a toughening agent and
   b) a substrate comprising graphite yarn
      wherein said composition is impregnated into said substrate and wherein the toughening agent is a derivative of polyvinyl alcohol selected from the group consisting of polyvinyl butyral, polyvinyl formal and combinations thereof and wherein the amount of toughening agent is less than 15% by weight based upon the total weight of the phenolic based resin and toughening agent.

2. A prepreg, as claimed in claim 1, wherein the substrate is unidirectional graphite tape.

3. A prepreg, as claimed in claim 2, wherein the tape has a fiber areal weight of about 120 g/m².

4. A prepreg as claimed in claim 1, wherein the amount of the composition is equal to from 20 to 40 weight percent of the total weight of the prepreg.

5. A prepreg, as claimed in claim 4, wherein the amount of the composition is equal to from 30 to 38 weight percent of the total weight of the prepreg.

6. A prepreg, as claimed in claim 4, wherein the amount of the composition is equal to from 33 to 37 weight percent of the total weight of the prepreg.

7. A prepreg, as claimed in claim 1, wherein the amount of toughening agent is equal to from 5 to 15 weight percent of the total weight of the phenolic based resin and toughening agent.

8. A prepreg, as claimed in claim 1, wherein the amount of toughening agent is equal to about 10 weight percent of the total weight of the phenolic based resin and toughening agent.

9. A prepreg, as claimed in claim 1, wherein the phenolic based resin is selected from the group consisting of novolacs and resoles, wherein said novolacs and resoles are derived from:
  a) a phenol selected from the group consisting of alkylated phenols, arylated phenols, halogenated phenols, fused aromatic ring structures, and polynuclear phenols reacted with
  b) a reactant selected from the group consisting of formaldehyde, paraformaldehyde, furfural, acetaldehyde, higher alkylated aldehydes, aromatic aldehydes, dicyclopentadiene, norbornene and combinations thereof.

10. A prepreg, as claimed in claim 9, wherein the phenolic based resin is a resole.

* * * * *